United States Patent

Gasior et al.

[15] 3,640,661

[45] Feb. 8, 1972

[54] CONTINUOUS-PARISON BLOW-MOLDING APPARATUS

[72] Inventors: Joseph Gasior, Bloomfield; Lloyd Kovacs, Somerset, both of N.J.

[73] Assignee: Midland-Ross Corporation, Cleveland, Ohio

[22] Filed: Oct. 13, 1969

[21] Appl. No.: 870,441

[52] U.S. Cl..........................425/159, 425/297, 425/326, 425/342, 425/387, 425/395, 425/451, 425/453
[51] Int. Cl..........................................................B29d 23/03
[58] Field of Search......................18/5 BB, 5 BC, 5 BE, 5 BT, 18/5 BP, 5 BQ, 12 DH, 12 R, 14 A, 30 JA

[56] References Cited

UNITED STATES PATENTS

| | | | |
|---|---|---|---|
| 2,854,691 | 4/1956 | Strong | 18/5 BC |
| 3,005,231 | 10/1961 | Pechthold | 18/5 BP |
| 3,357,046 | 12/1967 | Pechthold | 18/5 BT UX |
| 3,516,118 | 6/1970 | Gallay | 18/5 BE |
| 3,523,330 | 8/1970 | Gallay | 18/5 BE |

*Primary Examiner*—H. A. Kilby, Jr.
*Attorney*—Woodrow W. Portz and Irvin L. Groh

[57] ABSTRACT

Apparatus utilizing an extruder capable of moving in such a manner as to dispose a parison momentarily, selectively, and concurrently with a cutting operation, within each of a plurality of molding stations. Each station is occupied by a blow mold having halves which part and close during a cycle in which a section of the parison is received, severed, and blow molded therewithin. Essential to processing the parison is the movement of the extruder die along a sinuous path along which the die is rapidly withdrawn in a direction opposite to that of parison travel during and after severance of the parison section received in a mold.

13 Claims, 5 Drawing Figures

INVENTORS
JOSEPH GASJOR
LLOYD KOVACS
BY
ATTORNEY

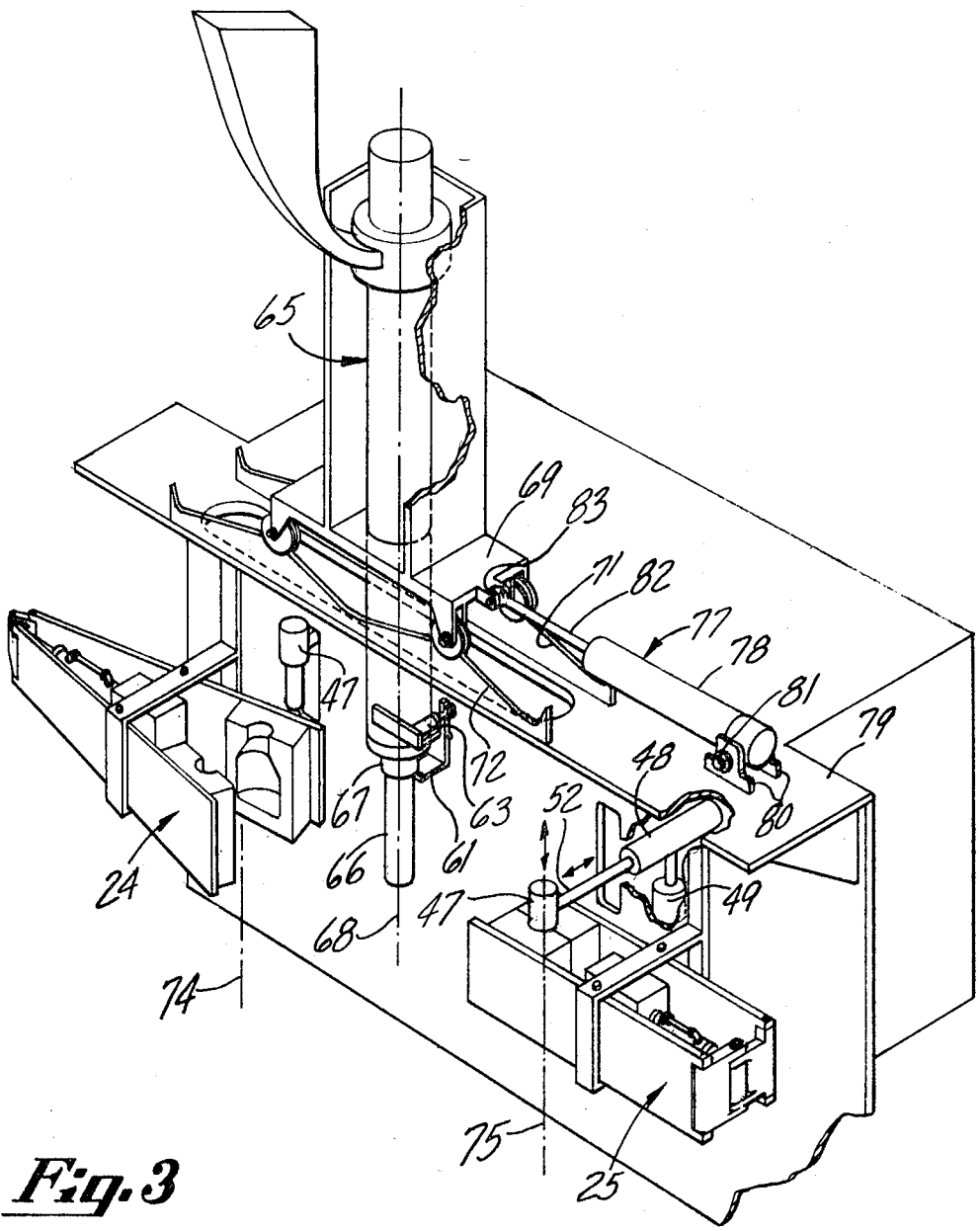

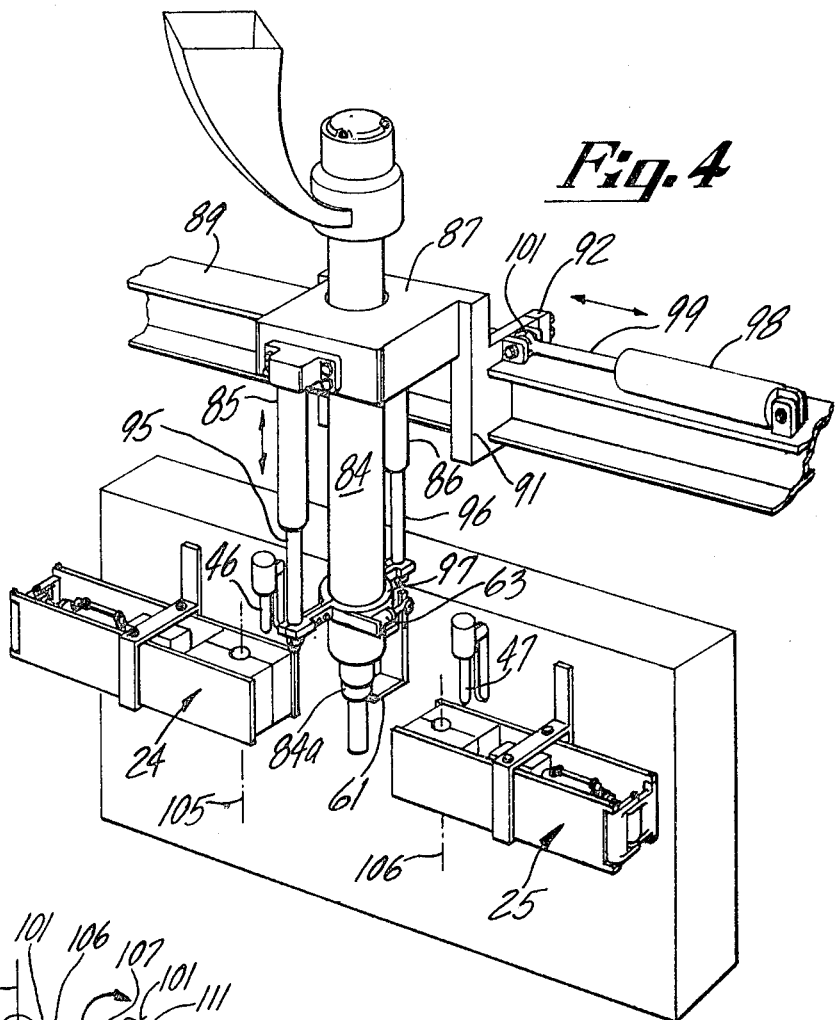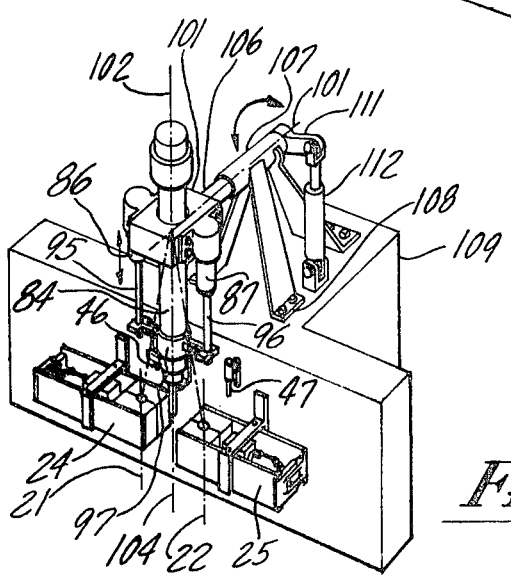

CONTINUOUS-PARISON BLOW-MOLDING APPARATUS

DESCRIPTION

In blow molding parisons of heat-degradable thermoplastic resins, such as the polyvinyl chlorides and the polycarbonates, it is desirable to conduct the molding process with as little waste as possible, i.e., with greatest possible avoidance of flash, pinch-off, and neck-finishing fragments. Such practice, when fully successful, enables the use of a high percentage of virgin resins with freedom from economic pressure to recycle relatively large amounts of waste plastic ordinarily accumulating from molding operations.

Hence, it is an object of the invention to provide machinery capable of blow molding articles from successive sections of parison without the production of economically significant scrap.

Another object is to provide blow-molding machinery capable of producing articles from a parison issuing continuously from an extruder.

It is especially an object to provide blow-molding apparatus for forming articles with a minimum of scrap from a continuously extruded parison of polyvinyl chloride or other heat-unstable thermoplastic compositions having a narrow melting temperature range and a tendency to heat degradation.

The objects of the invention are generally achieved in correlated extruding and blow-molding equipment wherein an extruder having a die suitable for discharging a parison is movably supported with respect to two or more blow molds comprising particle halves. The supporting structure for the extruder allows it to be shifted in a way to bring the axis of the parison into generally coaxial relation with any one of the parting axes of the molds. Such equipment further includes mechanism which traverses the extruder in a direction lengthwise of the parison and the parting axes in order that a sinuous motion of the die may be achieved. Rapid lifting of the extruder along a parting axis effectively nullifies linear movement of the parison relative to the respective blow mold so that parison-severing operation may be accomplished at each blow mold in a precise manner and the severed parison section may be promptly seized by vacuum or other means acting from the blow mold to avoid production of excessive scrap plastic.

In the drawing with respect to which the invention is described:

FIG. 3 is a perspective schematic view of another embodiment wherein the extruder is traversed in a horizontal direction by a cylinder over a track of varying slope to effect horizontal and movement components;

FIG. 4 is a schematic perspective of another embodiment in which the vertical and horizontal components of the motion of the extruder are controlled by horizontal and vertically aligned cylinders;

FIG. 5 is a schematic perspective of still another embodiment in which the extruder is adjustable in its lengthwise direction relative to support therefor which pivots on an axis extending transversely of the extruder length.

Figures 1, 2:
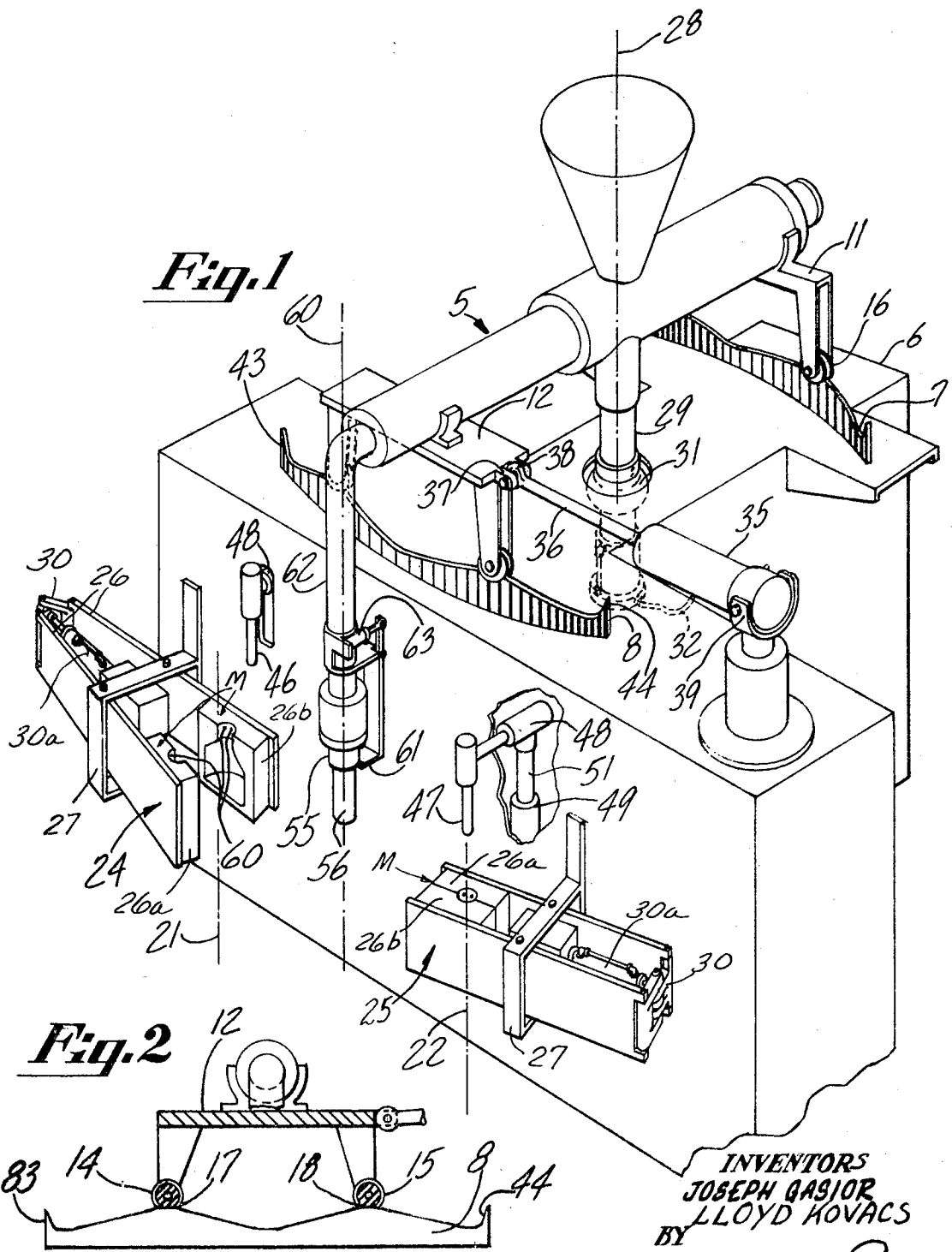
FIG. 1 is a perspective schematic view of one embodiment of the invention wherein an extruder may oscillate in a horizontal direction on a vertical axis and in a vertical direction by a sloping track.
FIG. 2 is a fragmentary front elevation of extruder cam and cam follower structure of the machine shown in FIG. 1.

Considering now the embodiment of FIG. 1, an extruder 5 is supported movable with respect to a base 6 by means of a pair of arcuate tracks 7, 8 and dolly structure 11, 12, each having a pair of rollers rotatably attached thereto as shown in FIG. 2 wherein the dolly 12 has rollers 14, 15 (only roller 16 of dolly 11 showing). The rollers are spaced as shown in FIG. 2 to register simultaneously with the peaks of respective tracks, i.e., with the rollers of dolly 11 contacting the peaks of track 7 when the rollers of dolly 12 rest on peaks 17, 18. Rotation of the extruder in either angular direction will cause downward motion of the extruder reaching its maximum as the parison axis 20 is shifted into registry with either parting axis 21 or 22 of blow mold 24, 25, respectively. Units 24 and 25 are shown in the various embodiments as illustrated in FIGS. 1, 3, 4, and 5. Each unit comprises clamping means, such as jaws 26, pivoted on a fixed bracket 27. As shown, a mold M comprises partible halves 26a and 26b supported on the jaws which open and close through operation of a double toggle link or hinge 30 connected from its center to one end of a fluid cylinder 30a which has its other end connected to the bracket 27 as shown. The extruder 5 is further centered about its axis 28 of rotation by a journal or stem 29 fixed to the extruder body extending into a conforming bearing or socket 31 therefor in the base 6.

This pivotal connection of the extruder with the base maximizes the precision of the rotative movements of the extruder and, since the stem is closely fitted to the socket 31 although it provides precise but free vertical movement of the stem relative to the base. As the extruder is required to rise abruptly from positions of maximum descent along the parting axis, the stem and the socket may function as a fluid cylinder with air or other fluid introduced into the bottom end of the socket 31 through a line 32 as the extruder rotates away from a mold parting axis 21 or 22.

The extruder is forcibly moved through its path from one parting axis to the other by power means such as the fluid cylinder 35 shown with its cylinder rod 36 connected to a clevis portion 37 of the dolly 12 by a universal joint connection 38. The closed end of the cylinder shell of the cylinder 35 is connected to the base by a universal joint comprising a rotating clevis 39 by trunnions fixed to the cylinder shell and pivoting in the eye portions of the clevis. Suitable stop means are provided such as abutments 43, 44 at the ends of track 8. Stopping may also be effected through any other well-known means such as limit switches and electrical circuitry controlling the fluid to the cylinder 35. A complete system will ordinarily include such mechanism operated in conjunction with other control means for opening and closing the blow mold units 24, 25, timing the admission of air to the blow molds through blow pins 46, 47, the operation of support and traversing cylinders 48, 49 of each blow pin, or any other control components. It may be noted from FIG. 1, as well as from FIGS. 3, 4 and 5 illustrating other embodiments, that the partible halves 26a and 26b are arranged in respective supports to separate when opening in opposite directions away from the extruder path which in an approximate manner contains the parting axes of the molds.

As shown, fluid cylinder 48 is mounted on the cylinder rod 51 of the cylinder 49 whereby the cylinder 48 and the blow pin assembly at the end of cylinder rod 52 may be traversed in a vertical direction in a manner for entering the adjacent blow mold along its parting axis 21 or 22. When retracted by the cylinder 49 from a blow mold, it is necessary for the blow pin assembly to move into the clear of the region traversed by the extrusion die 55 in moving into centered relation with the parting axis along which the blow pin is operated. Hence, the cylinder 48 has the function of withdrawing the blow pin assembly out of the ambit of the die 55 and any parison issuing therefrom.

At the instant at which a portion of the parison 56 is positioned within a blow mold of units 24 or 25, the parison must be severed instantaneously with the closing of the mold halves to a condition shown by mold unit 25. For this purpose, severing means is provided on the molds herein disclosed, such as knife 61 and its supporting and actuating assembly supported on a duct 62 which connects the die 55 with the extruder 5. The knife is operated by a fluid cylinder 63 aligned to drive the knife crosswise of the parison axis 20, as it comes into approximate coincidence with either parting 21 or 22. The knife may be operated just as the mold reaches closed position. The severed parison section may be supported within the closed mold by application of vacuum to apertures 60 in the neck-forming surface of both mold halves just as the mold reaches nearly closed condition slightly before the knife starts its stroke. It is possible to establish support for the severed parison section by having the parison slightly larger in diameter than the neck-forming portion of the mold, so that the section is seized as the mold closes.

FIG. 3 illustrates an extruder 65 mounted with its longitudinal axis coinciding with the axis of the parison 66 which emerges from the downwardly discharging die 67. The extruder 65 is supported on a carriage 69 shown as having four rollers arranged in coaxial pairs and spaced for engaging a pair of parallel tracks 71, 72 having similar lateral profiles with peaks of each track spaced as described with respect to track 8. As with the first described embodiment, the longitudinally spaced pairs of rollers of the carriage 69 engage all peaks simultaneously at a midway position of the extruder wherein the axis 68 is disposed between mold-parting axes 74, 75. As the extruder moves in either direction from this position, it traverses progressively lower surfaces on the tracks 71, 72 until a lowest position is reached as one pair of laterally opposite rollers reaches a point midway between the peaks of tracks 71, 72. This corresponds to registry of the parison axis 68 with one or other of the parting axes 74, 75.

Mechanism for traversing the extruder and the carriage 69 is provided, such as the fluid cylinder 77 (preferably hydraulically actuated) having its shell 78 pivotally attached to a base 79 by a pivotal connection comprising trunnions 81 and a clevis 80. The cylinder rod 82 is pivotally attached to the carriage 69 by the pivotal connection 83.

The motion of the extruder 65 and the parison issuing therefrom is such that the parison axis traverses within a vertical plane, whereas the motion of the extruder 5 (the embodiment of FIG. 1) is such as to cause the parison axis to shift along the surface of revolution of a cylinder in moving from one mold-parting axis of one mold to the other. In other respects, the timing of mold opening, mold closing, parison delivery, parison cutting, air blowing, operation of the blow pin positioning cylinders 48, 49 may be identical with that of the first described embodiment.

FIG. 4 illustrates another embodiment described thirdly herein. This equipment of FIG. 4 is characterized by an absence of cam tracks for producing vertical motion of the parison relative to the blow molds. The motions of an extruder 84 relative to the blow molds is generated entirely by fluid cylinders (preferably hydraulically actuated). As shown, two vertically aligned parallel cylinders 85, 86 are fixed to a sliding carriage 87 in horizontally sliding relation with a rail 89. The carriage 87 comprises a bracket portion 91 and a hook tip element 92 detachable from the portion 91, conforming at least partially to a transverse cross section of the rail 89. Preferably the carriage comprises two sets of connected elements 91, 92 spaced longitudinally along the rail 89. The cylinder rods 95, 96 of cylinders 85, 86, respectively, are anchored in a clamp 97 fixed to a lower portion of the extruder 84. Liquid supply means providing equal quantities of fluid per unit time to the cylinders 85, 86 controlled by conventional flow control means raise and lower the extruder according to any desired pattern of vertical motion. A fluid cylinder 98 shown mounted on and pivotally attached by its closed end is pivotally attached by its cylinder rod 99 to the carriage 87 at pivotal connection 101. The cylinders 98 and 85, 86 are synchronously actuated to produce patterns of movement similar or equivalent to those produced by the two earlier described embodiments in the delivery of parison material to the blow mold of units 24 or 25.

In general principle, these cylinders control the motion of the extruder 84 and its die 84a so that the extruder is at its highest position when the extruder and parison axis 104 is positioned midway between mold-parting axes 105, 106. As the extruder is shifted by cylinder 98 in either direction toward one or the other blow mold axes, the cylinders 85, 86 lower the extruder and parison toward the respective blow mold and reach the lowest point of descent as the parison axis 104 centers with the blow mold parting axis. At this instant, the blow mold in question has snapped shut simultaneously with operation of the knife-cylinder assembly 61, 63 to sever the parison from that section deposited within the blow mold. Preferably, the operation of severing means, such as the knife-cylinder assembly, is correlated with operation of cylinders 85, 86 to effect reversal of the movement of the extruder to abruptly upwardly just as the knife begins severance of the parison. Such operation assures horizontal cutting of the parison if the upward movement of the extruder is approximately equal to the linear rate of parison extrusion from the extruder die. An advantage of the embodiment illustrated in FIG. 4 is that the path of the extruder die 84a between mold units may be extremely short and molds, such as units 24, 25, may be placed with their parting ends relatively closely together as compared with the cam-operated equipment of FIGS. 1 and 3.

The embodiment described herein and illustrated by FIG. 5 differs essentially with that of FIG. 4 in that the carriage 101 and the extruder 84 carried thereby, instead of being traversed in a straight line path, are pivoted about an axis 100 which extends transversely of the parison axis 102 along which a parison 104 issues. The extruder 84 may be supported from the carriage 101 in exactly the same manner as shown with respect to carriage 87 in FIG. 4. That is to say, the carriage 101 has fluid cylinders 86, 87 fixed by their closed ends to the carriage and rods 95, 96 thereof fixed to a clamp 97 affixed as earlier described to the extruder body. These cylinders raise and lower the extruder with respect to carriage 101. Support of the extruder and the carriage assembly just described is derived through extension of a journal 106 of the carriage through a bearing portion 107 of a stand 108 fixed to the base 109. Rocking or oscillation of the extruder-carriage assembly is effected by means, such as a lever 111 fixed to a distal end portion of the journal 106 and a fluid cylinder 112 connected pivotally with the base 109 or other fixed agency.

In this embodiment, the blow mold units 24, 25 are shown with their parting axes 21, 22 perpendicular and parallel. Accordingly, the cylinder 112 is actuated and controlled in a manner causing the extruder to pivot or oscillate through the angle shown wherein the axis 104 intersects with axes 21 and 22 at respective molds. The ambit of the extruder also includes the component of motion contributed by the cylinders 86, 87 which act to abruptly raise the extruder as its die passes out of overhead relation with a mold, and to lower the extruder as it swings toward a mold. The blow pins 46, 47 are arranged accordingly to enter the blow molds along respective parting axes, as disclosed hereinbefore.

It is possible in the embodiments of FIGS. 4 and 5 to arrange the blow mold units 24, 25 in closely facing proximity so that the extruder needs to make but small lateral or swinging movements to place the die thereof immediately over the pin-receiving opening of either blow mold. An advantage of such close disposition is that the short lateral movements of the extruder may be quite slow as compared to those wherein the nature of the apparatus requires longer movements of the parison die relative to the parting axes. In utilizing shorter travel transversely to the parison axis, the sidewise momentum imparted to the parison may be reduced.

In the operation of molding machines according to the various embodiments described above, there are two different methods by which a parison section is severed at the end of horizontal travel of the extruder and received by the blow mold. In machines according to FIGS. 1 and 3, entailing the provision of cams to effect vertical movement of the extruder, a parison section is preferably severed at a level relative to the receiving blow mold slightly above that at which the parison section is positioned within the mold during actual molding. The die in each case traverses an arch-shaped ambit in moving from mold to mold. To reach its proper level at molding position, the parison section is severed and dropped through a free fall, e.g., of ½ inch, more or less. The closing of the mold is timed with respect to the movement of the severing knife to allow the mold halves to snap shut on the parison section as the section freely falls to a proper molding level. It is essential that the free fall be restricted to heights which avoid excessive sagging resulting from inertia of the falling material. The free-fall method is necessitated by the inability in the use of cam-elevating structure to accomplish solely vertical rise of the extruder and die assembly over a blow mold to the degree necessary to effect stationary parison movement relative to the mold at the instant of severing. Where cams are relied upon for vertical movement, the cam surface must have a slope suitable for commencing a reverse movement at the end of its ambit.

The second method of depositing a parison section in a blow mold involves, as just inferred, exclusively vertical movement of the die and extruder assembly, i.e., movements in which the parison axis remains in alignment with the parting axis of a mold at the beginning of a normally arch-shaped ambit of movement of the parison die from one mold to the other. Such operation is readily accomplished by apparatus in accordance with FIGS. 4 and 5 wherein the cylinders 86, 87 are provided for the purpose of moving the extruder die assembly lengthwise of the parison axis. This permits coordinated programming of cylinders 86, 87 with the cylinder for effecting lateral movement of the die to accomplish any desired movement pattern. In the operation of the machines of FIGS. 4 and 5, the extruder, after downward movement placing the die in close proximity to the mold, moves upwardly approximately along the parting axis of each mold at a speed approximately equal to that of parison extrusion enabling the positioning of a parison section which is approximately stationary with respect to the mold receiving the section. To facilitate timely separation of the parison section from the parison, severing means, such as the knife-cylinder assembly, may be mounted on one-half of each mold.

As earlier mentioned, vertical movement of the type just described may be accomplished with the apparatus of FIG. 1 by providing the pivotal support of the extruder 5 as a vertically acting fluid cylinder.

The normal or neutral position of the extruder in each may be assumed midway between molding stations. The length of the parison, for example, may be monitored by photocells which signal the power actuators for various components of the machine.

What is claimed is:

1. Blow-molding apparatus comprising:
an extruder having a die aligned for discharging a parison generally along an axis in fixed relation with the extruder;
a plurality of molds comprising partible halves associated with mold support means therefor and spaced along a stationary path along which each mold opens and closes with respect to a generally central parting axis in transverse, substantially fixed relation with said path said halves arranged on said mold support means to separate in opposite directions away from said path;
clamping means for opening and closing said halves;
mount means for supporting and moving said extruder with said parison axis moving along said path while aligned in transverse relation therewith;
said mount means including guide means arranged for controlling the movement of the extruder so as to pass said parison axis into and out of substantially coaxial relation with each parting axis;
said mount means including means for reciprocating the extruder lengthwise of said parison axis in timed relation with movements of the extruder corresponding with passage of the parison axis from one parting axis to the next one along said path and travel of said die in sinuous motion from parting axis to parting axis, said reciprocating means being constructed and arranged to dispose said die at a predetermined minimum distance from said molds as the parison axis passes into and out of registry with a parting axis; and
means disposed between each of said molds and said die when disposed relatively thereto at said minimum distance for severing a parison section disposed in the mold from a parison issuing from said die at an instant wherein said extruder is positioned to dispose said parison axis in substantial registry with the respeCtive one of said parting axes.

2. The apparatus of claim 1 wherein:
said reciprocating means comprises cam and cam-following means shared by the extruder and the mount means.

3. The apparatus of claim 2 wherein:
portions of the cam and cam-follower means are disposed concentrically with, and on opposite sides of, said pivot axis.

4. The apparatus of claim 1 wherein:
said path is arcuate; and
said mount means and the extruder form a pivotal connection along a pivot axis extending transversely with respect to the length of the extruder, and said pivot axis is spaced relative to said die and said path to cause said parison axis to traverse said path.

5. The apparatus of claim 1 wherein:
said path is arcuate;
said mount means forms a pivotal, axially adjustable connection with the extruder along a generally vertical pivot axis, and said die faces downward to dispose said parison axis in corresponding downward alignment and in intersecting relation with said path.

6. The apparatus of claim 1 comprising:
a blowtube for each mold;
mounting means for each blowtube comprising a horizontally aligned reciprocator effecting retraction of the blowtube from the path of said die and another reciprocator aligned for movements generally parallel to the parison axis for engaging the tube with the mold when positioned along said parison axis.

7. The apparatus of claim 1 wherein:
said path is arcuate between two horizontally spaced parting axes;
said mount means and the extruder form a pivotal, axially adjustable connection along a generally vertical pivot axis, and said die faces downward to dispose said parison axis in corresponding downward alignment and intersecting relation with said path;
said clamping means comprises actuating mechanism disposed outside a region extending between and along the two parting axes.

8. The apparatus of claim 1 wherein:
said path is arcuate and the extruder is aligned with its length extending in a horizontal direction;
said mount means comprises a journal fixed to the extruder and bearing means in conforming relation with the journal fixed to a base portion of the mount means, said bearing providing rotatable and axial movement relative to the journal;
said reciprocating means comprises engaged cam and cam-follower means attached at opposite sides of the journal to the extruder and a base portion of said mount means with relative movement of the cam-follower means and the cam means occurring in response to pivotal movement of the extruder relative to said base portion to change the axial position of the journal and the extruder relative to the base;
said cam means being shaped to correlate pivotal and axial movements of the extruder carrying said die axially toward each mold from a neutral axially remoter position between adjacent parting axes as said extruder pivots in either direction to a position placing said parison axis into coincidence with a parting axis.

9. The apparatus of claim 1 wherein:
said path is nonarcuate and extends in a plane containing two horizontally spaced parting axes;
said mount means comprises a horizontally rectilinear track having upper curvate surfaces of sinuous contour conforming to a desired pattern of motion lengthwise of the track for said extruder and die, and said mount means further comprises a dolly in fixed connection with said extruder and in guide relation with said track surfaces, said dolly carrying said extruder along said path with its longitudinal axis disposed generally in said plane.

10. The apparatus of claim 1 wherein:

said path extends along a plane containing two horizontally spaced parting axes;

said mount means comprises a guide rail in parallel relation with the path, and a carriage mounted on the rail in guide relation therewith;

said reciprocating means being attached to the carriage and to the extruder to support and align said extruder with its axis merged with the parison axis, said reciprocating means being aligned to reciprocate the extruder lengthwise of its own axis.

11. The apparatus of claim 10 wherein:

said reciprocating means is a pair of fluid cylinders fixed to the carriage on opposite sides of the extruder with the longitudinal axes of the cylinders parallel with the extruder axis.

said reciprocating means is a pair of fluid cylinders fixed to the carriage on opposite sides of the extruder with the longitudinal axes of the cylinders parallel with the extruder axis.

12. The apparatus of claim 1 wherein:

said path extends within a generally perpendicular plane containing two horizontally spaced parting axes;

said mount means comprises a base providing a bearing defining a generally horizontal pivot axis, and a carriage having a journal extending through said bearing;

said reciprocating means is attached to said carriage and arranged therewith to support said extruder with its longitudinal axis merged with said parison axis and within said vertical plane, said horizontal pivot axis intersecting said extruder axis; and power lever means operably connected with said journal and said base to oscillate an assembly of said carriage, reciprocator, and extruder through an ambit bringing said parison axis into coincident relation with either of said parting axes at points therealong within either of said molds.

13. The apparatus of claim 12 wherein:

the apparatus is arranged to cause said axes to intersect at a common point.

* * * * *

PO-1050
(5/69)

UNITED STATES PATENT OFFICE
CERTIFICATE OF CORRECTION

Patent No. 3,640,661      Dated February 8, 1972

Inventor(s) Joseph Gasior and Lloyd Kovacs

It is certified that error appears in the above-identified patent and that said Letters Patent are hereby corrected as shown below:

Column 1, line 66, "movable" should be -- movably --.

Column 2, line 2, add -- units -- after "mold".

Column 6, line 6, before the period add -- the portion of said cam and cam following means on the mount being stationary --.

Line 10, before the period add -- for said extruder extending transversely of its length --.

Column 7, line 20, delete "said reciproacting means is a pair of fluid cylinders fixed to the carriage on opposite sides of the extruder with the longitudinal axes of the cylinders parallel with the extruder axis".

Signed and sealed this 27th day of June 1972.

(SEAL)
Attest:

EDWARD M. FLETCHER, JR.
Attesting Officer

ROBERT GOTTSCHALK
Commissioner of Patents